United States Patent [19]

Schaumburg et al.

[11] 3,952,927
[45] Apr. 27, 1976

[54] INJECTION NOZZLE HAVING GUIDES FOR NOZZLE ROD

[75] Inventors: Ernest C. Schaumburg, North St.Paul; Robert K. Larson, St. Paul, both of Minn.

[73] Assignee: Standard Oil Company, Chicago, Ill.

[22] Filed: June 23, 1975

[21] Appl. No.: 589,399

Related U.S. Application Data

[63] Continuation of Ser. No. 464,311, April 26, 1974, abandoned.

[52] U.S. Cl. .............................. 222/510; 222/559; 251/282; 425/245 R
[51] Int. Cl.² .......................................... B29F 1/03
[58] Field of Search.......... 251/282; 425/244, 245 R, 425/247, DIG. 224, DIG. 225; 222/495, 504, 510, 559

[56] References Cited
UNITED STATES PATENTS

| | | | |
|---|---|---|---|
| 2,408,463 | 10/1946 | Wright | 222/559 X |
| 3,054,533 | 9/1962 | Kurek | 222/510 X |
| 3,535,742 | 7/1967 | Marcus | 425/245 X |
| 3,722,801 | 3/1973 | Chapuis | 251/282 X |
| 3,741,704 | 6/1973 | Beasley | 425/245 |
| 3,746,492 | 7/1973 | De Vita | 425/245 R |

FOREIGN PATENTS OR APPLICATIONS

| | | | |
|---|---|---|---|
| 851,214 | 10/1960 | United Kingdom | 251/282 |

*Primary Examiner*—Robert B. Reeves
*Assistant Examiner*—David A. Scherbel
*Attorney, Agent, or Firm*—Stanley M. Welsh; Arthur G. Gilkes; William T. McClain

[57] ABSTRACT

A nozzle, particularly adapted for the production of articles of structural or dense foam, provided with extended guide surfaces or splines adapted to contact the enlarged portion of a nozzle rod. The forward end of an enlarged portion of the nozzle rod remains in contact with the splines during complete operation cycle.

6 Claims, 7 Drawing Figures

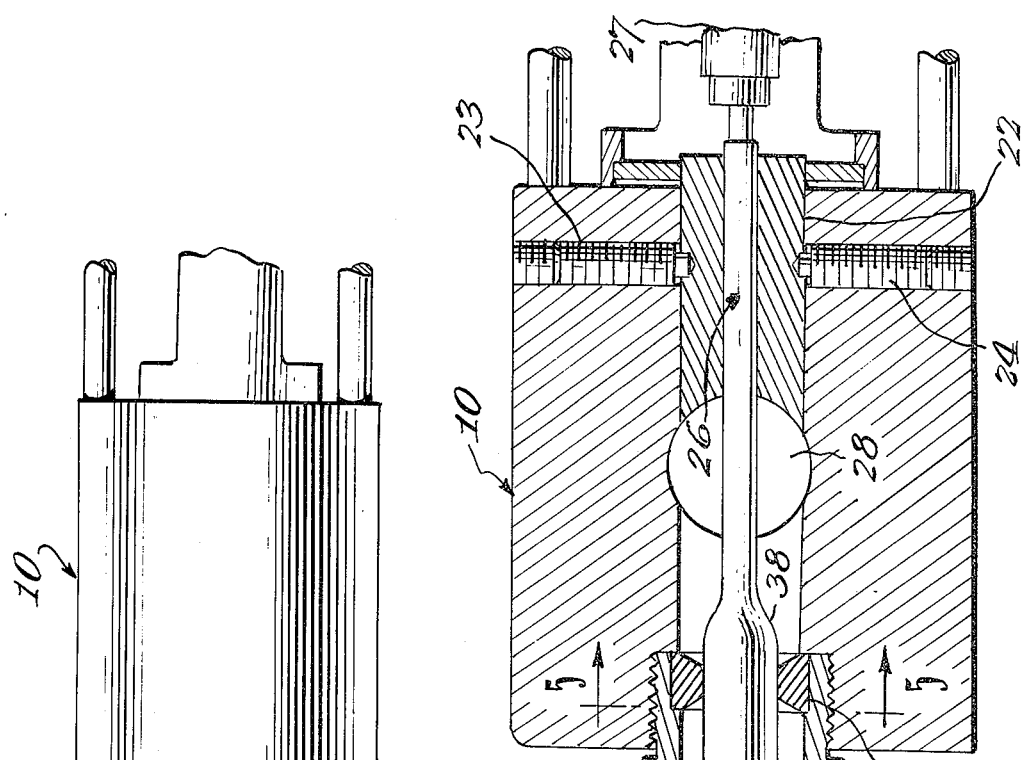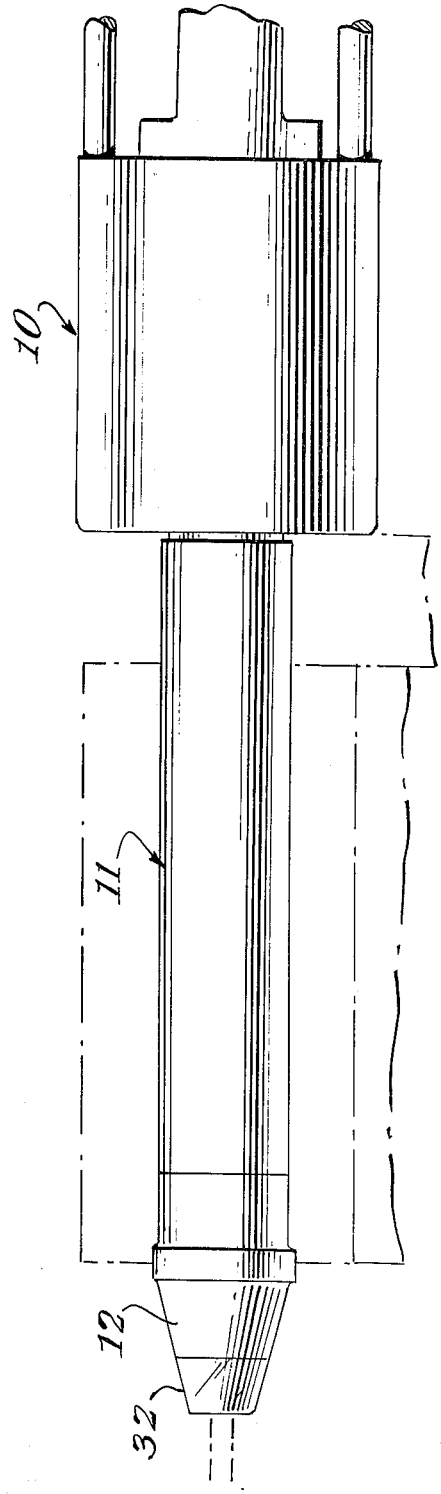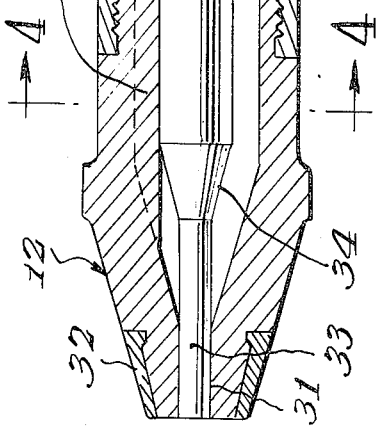

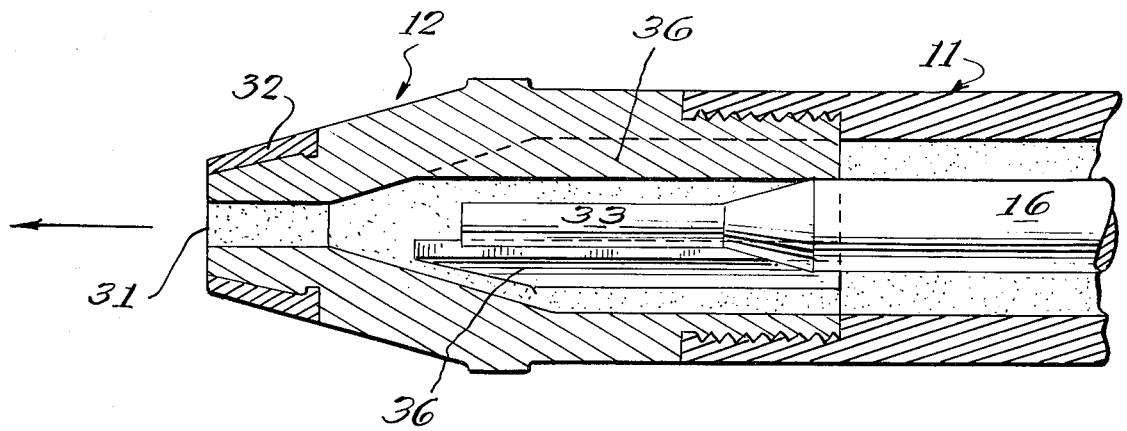
Fig. 3
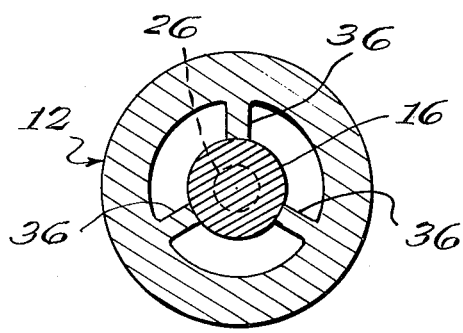
Fig. 4
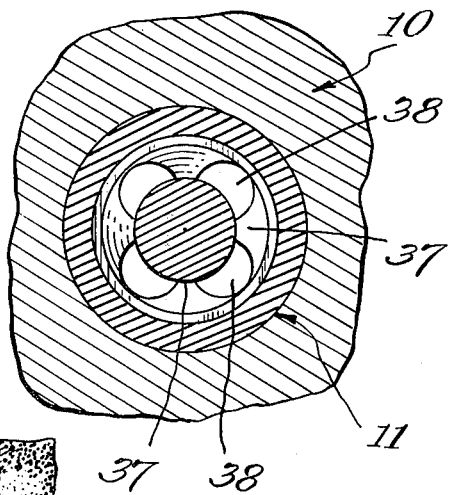
Fig. 5
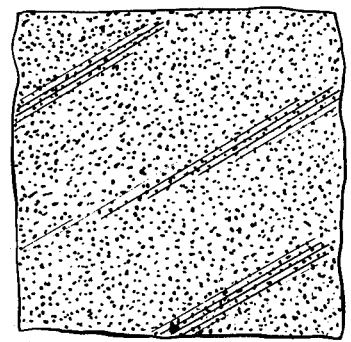
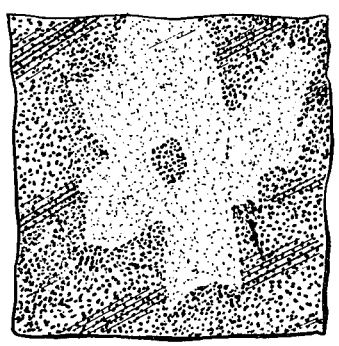
Fig. 7

INJECTION NOZZLE HAVING GUIDES FOR NOZZLE ROD

This is a continuation of application Ser. No. 464,311 filed Apr. 26, 1974, now abandoned.

BACKGROUND OF THE INVENTION

1. Field of the Invention

This invention relates to extrusion nozzles and a complete injection molding system nozzle assembly. The nozzle is particularly applicable in the production of articles comprisig structural or dense foam.

2. Description of the Prior Art

In the production of molded articles of dense foam, a problem exists in that the system produces an imperfection, known as a splash or splay mark, near the point of plastic injection. Since multiple gates or injection ports, are often required, several splay mark areas are frequent on structural foam pieces.

This nozzle is applicable for use in any injection molding system but we believe that it will find its greatest use in the production of dense foam parts. These can be comparatively large pieces weighing several pounds.

The particular method and apparatus used in producing these parts is well known in the art and reference to Angell, Jr., U.S. Pat. No. 3,268,636 (1966) and DeVita, U.S. Pat. No. 3,746,492 (1973) is made for a general description of the operation. These patents are incorporated herein by reference. In summary, a thermoplastic material is extruded, a foaming agent such as nitrogen is added, and a sufficient amount of the mixture to fill a subsequent mold is accumulated in an accumulator. When the mold is closed, a quick acting nozzle is opened and the thermoplastic material in the accumulator is rapidly injected into the mold after which the nozzle valve is closed. A difficulty which has been encountered in the production of these dense foam articles is an imperfection near the gate area, this imperfection usually appearing different in color and surface finish than the surrounding surfaces. Since multiple gates are required in larger articles, several splay mark areas are frequent on structural foam pieces. These lead to customer rejection of otherwise acceptable parts.

SUMMARY OF THE INVENTION

We have discovered that the splay marks result from injection of plastic which, during the closed cycle of the nozzle, plates out on the nozzle rod. In the prior art, the forward end of the nozzle rod was supported at a comparatively small area and upon opening of the valve by rearward movement of the nozzle rod, the support surfaces scraped the deposited plastic from the nozzle rod and this was injected into the mold and being cold, deposited near the opening or gate area. This problem was overcome by redesigning the nozzle so as to provide guide surfaces which remain in contact with the forward end of the portion of the nozzle rod supported by the guide surfaces in such a manner that there is no portion of the nozzle rod upon which polymer can plate which is scraped off of the nozzle rod by the supporting surfaces. Since there is no scraping of the nozzle rod, there results no such solidified polymer which can be deposited near the gate area.

The object of the present invention is to provide a molding system nozzle for use in a molding system nozzle assembly provided with a particular nozzle rod by which dense foam products can be produced without the objectionable splay marks.

Broadly, the invention resides in an injection molding nozzle assembly wherein a nozzle rod moves back and forth to open and close an outlet port in a nozzle and wherein said nozzle rod is supported in the nozzle, wherein the improvement comprises support means in said nozzle to guide the forward end of said nozzle rod, said rod and support means being so arranged that no portion of the nozzle rod between the support means and the outlet port of the nozzle upon which material can deposit is scraped during movement between closed and opened positions. More specifically, the invention resides in an injection molding system nozzle comprising an upstream open end, a downstream open tip smaller than said open end, the internal opening extending longitudinally with the shape of the upstream open end, a frustoconical section between said major portion and said tip, and a plurality of splines extending from the upstream of the frustoconical section to the upstream end of the nozzle, said nozzle being adapted to cooperate with a nozzle rod having a downstream end adapted to close the opening in said tip in the forward position and to open said opening in its rearward position, and an upstream end of increased diameter adapted to contact said splines and wherein the downstream end of said portion of increased diameter remains in contact with said splines throughout movement from closed to open positions.

In a further aspect, the invention resides in an injection molding system nozzle assembly comprising a mounting block, a resin supply port in said mounting block, an elongated nozzle extension connected to said mounting block, a nozzle connected to said nozzle extension having an outlet port capable of communicating with a mold, a nozzle rod, and means to move said nozzle rod within said nozzle assembly to open and close the outlet port in said nozzle; said nozzle rod having a small diameter at its downstream end mating with the nozzle outlet port, and an enlarged midportion; rear guide support means adapted to guide the upstream end of the enlarged midportion of the nozzle rod; a plurality of splines extending longitudinally of said nozzle adapted to guide the downstream end of the enlarged position of said nozzle rod, the downstream end of the enlarged portion of the nozzle rod remaining in contact with said splines throughout movement from closed to open positions. Preferably the nozzle rod has a small diameter at its upstream end in the vicinity of the resin supply port which is the same diameter as the downstream end.

REFERENCE TO DRAWING

FIG. 1 illustrates the assembly of the injection molding system;

FIG. 2 shows, in section, the nozzle assembly of FIG. 1 with the nozzle rod in the forward or closed position;

FIG. 3 shows the forward end of the nozzle assembly, in section, with the nozzle rod in the open position;

FIG. 4 is a cross-section view on line 4—4 of FIG. 2 showing the forward nozzle rod support splines;

FIG. 5 a section on line 5—5 of FIG. 2, shows the rear nozzle rod support means;

FIG. 6 shows a portion of a molded article produced according to the prior art with a visible splay mark; and FIG. 7 shows a similar area produced using the nozzle of this disclosure.

DETAILED DESCRIPTION

The nozzle and nozzle assembly of the present invention were developed following a recognition of the cause of the splash or splay marks in molded articles of dense foam. The design to be described provided for operation of a nozzle rod in a nozzle so designed that there is no surface on the nozzle rod in which material can deposit in the vicinity of the nozzle which can be scraped by the nozzle rod support means in the nozzle.

Considering the drawing, the invention will be more fully described. An exterior view of the nozzle rod assembly appears in FIG. 1. Shown therein is the mounting block 10, the nozzle extension 11 and the nozzle 12, the parts having threaded connecting means.

Similar numbers are used in the subsequent Figures for like parts wherein these parts are shown in greater detail.

In FIG. 2, a longitudinal sectional view of the assembly of FIG. 1, the structure is shown in detail with the nozzle rod 16 in the forward or closed position. At the rear of mounting block 10 there is provided a guide block 22 which is held in position by a plurality of set screws 23 and 24. Guide block 22 is provided with an opening for the rear extension 26 of the nozzle rod 16, this rearward extension of the nozzle rod being, in turn, connected to the hydraulic operating system 27 for controlling rearward and forward motion of nozzle rod 16.

The resin supply port 28 supplies resin from the accumulator (not shown) to the nozzle assembly. The upstream end of nozzle rod 16 moves on support means 29, more fully described in FIG. 5.

For the most part, the apparatus previously described is conventional.

The nozzle 12 of the invention provides the advantages of this invention. As best seen in FIGS. 2 and 3, this nozzle has a nozzle outlet port 31 which communicates directly with a mold. The forward end of the nozzle also has a insulating section 32. The forward end 33 of rod 16 is of reduced diameter at its downstream end which, in a forward position, closes outlet port 31 of nozzle 12. The radial distance between the nozzle rod and the internal surface of nozzle extension 11 and nozzle 12 should be between 3/16 inch and ½ inch with ¼ inch being preferred. Between the small upstream end 33 of nozzle 16 and the enlarged central portion thereof is a frustoconical section 34. Supporting the forward end of the enlarged section of nozzle rod 16 are a plurality of splines 36, these extending for a sufficient length such that the forward end of enlarged portion of the nozzle rod 16 remains in contact with said splines throughout its movement from closed (FIG. 2) to open (FIG. 3) positions.

The rear support for nozzle rod 16 is shown in FIG. 5, although this does not constitute a specific feature of my invention an alternative means could be used. As shown, a series of guide supports are provided. Since the resin is maintained at a sufficiently high temperature in this upstream position of the nozzle assembly, there is no plating out upon nozzle rod 16 and no material is, subsequently, scraped from the upstream end of the rod 16.

One additional safety feature has been designed into this structure although the advantage obtained by using the elongated splines 36 is not dependent thereon. This involves the reduced portion 26 and the expanding section 38 by which section 26 joins the enlarged section of rod 16. Preferably, reduced portions 26 and 33 are the same size. In operation, the resin is supplied under pressure through opening 28, such pressure resulting in a force tending to open the valve as the pressure of the resin pushes against frustoconical section 34. This is balanced by pressure tending to push the rod to the closed position exerted against the area 38. Thus, should there be a failure of the hydraulic system 27, the pressures on rod 16 are balanced and there is not resultant force tending to push nozzle rod 16 to the open position. Without this feature, failure of the hydraulic pressure would open the valve resulting in a discharge of plastic through nozzle outlet port 31.

EXAMPLE

Our nozzle has been used in the productin of a two part stool, each part weighing about 3 ½ pounds using a high flow injection molding polymer of propylene (Amoco polypropylene Grade 1016) and nitrogen as the blowing agent. The parts do not exhibit the objectionable splay marks obtained when using nozzles of the prior art.

Other resins such as polyethylene and polystyrene can be used with equally good results.

While a specific embodiment of the invention has been described, those skilled in the art realize changes can be made coming within the spirit and scope of the invention.

We claim:

1. In an injection molding nozzle assembly having a nozzle rod with an enlarged portion and a reduced diameter at its downstream end which moves back and forth to open and close an outlet port in a nozzle and a support means in said nozzle which rigidly supports the nozzle rod by more than point contact, wherein the improvement comprises said support means which guides the forward end of said nozzle rod and which extends in a downstream direction at least to the beginning of the enlarged portion of said nozzle rod when the nozzle is closed whereby said rod and said support means are so arranged that no surface on the nozzle rod which material in the vicinity of the nozzle can deposit is scraped during movement between closed and opened positions.

2. The nozzle assembly of claim 1, wherein said support means comprises a plurality of longitudinally extending splines which maintain contact with a forward bearing surface on the nozzle rod at all times.

3. An injection molding system nozzle assembly comprising a mounting block, a resin supply port in said mounting block, an elongated nozzle extension connected to said mounting block, a nozzle connected to said nozzle extension having an outlet port capable of communicating with a mold, a nozzle rod, and means to move said nozzle rod within said nozzle assembly to open and close the outlet port in said nozzle; said nozzle rod having a small diameter at its downstream end mating with the nozzle outlet port, and an enlarged midportion; rear guide support means adapted to guide the upstream end of the enlarged midportion of the nozzle rod; a plurality of splines extending longitudinally at least to the beginning of the enlarged midportion at the downstream end when said nozzle rod is in a closed position and adapted to guide the downstream end of the enlarged position of said nozzle rod, the downstream end of the enlarged portion of the nozzle rod remaining in more than point contact with said splines in such arrangement that no surface on which material can deposit in the vicinity of said nozzle is scraped throughout movement from closed to open positions.

4. An injection molding system nozzle assembly comprising a mounting block, a resin supply port in said mounting block, an elongated nozzle extension connected to said mounting block, a nozzle connected to said nozzle extension having an outlet port capable of communicating with a mold, a nozzle rod, and means to move said nozzle rod within said nozzle assembly to open and close the outlet port in said nozzle; said nozzle rod having a small diameter at its downstream end mating with the nozzle outlet port, an enlarged midportion, and a small diameter at its upstream end in the vicinity of the resin supply port; rear guide support means adapted to guide the upstream end of the enlarged midportion of the nozzle rod; a plurality of splines extending longitudinally of said nozzle adapted to guide the downstream end of the enlarged position of said nozzle rod, the downstream end of the enlarged portion of the nozzle rod remaining in contact with said splines throughout movement from closed to open positions.

5. In an injection molding nozzle assembly wherein a nozzle rod moves back and forth to open and close an outlet port in a nozzle and wherein said nozzle rod is supported in the nozzle by a support means, the improvement which comprises said support means in said nozzle to guide the forward end of said nozzle rod being so arranged that no surface on said nozzle rod in the vicinity of the nozzle on which material can deposit during a closed cycle of the nozzle is scraped by said support means during movement between closed and opened positions.

6. An injection molding system nozzle comprising an upstream open end, a downstream open tip smaller than said open end, a major portion of said nozzle having an internal opening extending longitudinally with the shape of the upstream open end, a frustoconical section between said major portion and said tip, a nozzle rod having a downstream end adapted to close the opening in said tip in the forward position and to open said opening in its rearward position, an upstream end of enlarged diameter, and a plurality of splines attached to said nozzle extending in the downstream direction at least to the beginning of the enlarged portion of said nozzle rod when the nozzle is closed wherein the downstream end of said portion of increased diameter remains in more than point contact with said splines in such arrangement that no surface on which material can deposit on said nozzle rod in the vicinity of said nozzle is scraped throughout the movement from closed to open position.

* * * * *

UNITED STATES PATENT OFFICE
CERTIFICATE OF CORRECTION

Patent No. 3,952,927　　　　　Dated April 27, 1976

Inventor(s) Ernest C. Schaumburg et al.

It is certified that error appears in the above-identified patent and that said Letters Patent are hereby corrected as shown below:

Column 1, line 12, "comprisig" should read -- comprising --.

Column 3, line 6, "provided" should read -- provides --.

Column 3, line 8, "in" should read -- on --.

Column 4, line 9, "not" should read -- no --.

Column 4, lines 41 and 42, "nozzle rod which" should read -- nozzle rod on which --.

Signed and Sealed this

Seventh Day of September 1976

[SEAL]

Attest:

RUTH C. MASON
Attesting Officer

C. MARSHALL DANN
Commissioner of Patents and Trademarks